United States Patent
Abernathy et al.

(10) Patent No.: US 7,490,224 B2
(45) Date of Patent: Feb. 10, 2009

(54) TIME-OF-LIFE COUNTER DESIGN FOR HANDLING INSTRUCTION FLUSHES FROM A QUEUE

(75) Inventors: Christopher Michael Abernathy, Austin, TX (US); Jonathan James DeMent, Austin, TX (US); Ronald Hall, Cedar Park, TX (US); Robert Alan Philhower, Valley Cottage, NY (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 11/246,587

(22) Filed: Oct. 7, 2005

(65) Prior Publication Data

US 2007/0083742 A1 Apr. 12, 2007

(51) Int. Cl.
  *G06F 9/30* (2006.01)
(52) U.S. Cl. .................................................. 712/214
(58) Field of Classification Search .................. 712/214
  See application file for complete search history.

(56) References Cited

U.S. PATENT DOCUMENTS

| | | | |
|---|---|---|---|
| 5,764,938 A | 6/1998 | White et al. | 712/200 |
| 6,609,190 B1 * | 8/2003 | Kahle et al. | 712/214 |
| 6,804,770 B2 | 10/2004 | Logan et al. | 712/215 |

* cited by examiner

*Primary Examiner*—Eddie P Chan
*Assistant Examiner*—John Lindlof
(74) *Attorney, Agent, or Firm*—VanLeeuwen & VanLeeuwen; D'Ann N. Rifai

(57) ABSTRACT

Tracking the order of issued instructions using a counter is presented. In one embodiment, a saturating, decrementing counter is used. The counter is initialized to a value that corresponds to the processor's commit point. Instructions are issued from a first issue queue to one or more execution units and one or more second issue queues. After being issued by the first issue queue, the counter associated with each instruction is decremented during each instruction cycle until the instruction is executed by one of the execution units. Once the counter reaches zero it will be completed by the execution unit. If a flush condition occurs, instructions with counters equal to zero are maintained (i.e., not flushed or invalidated), while other instructions in the pipeline are invalidated based upon their counter values.

3 Claims, 8 Drawing Sheets

TIME-OF-LIFE COUNTER DESIGN FOR HANDLING INSTRUCTION FLUSHES FROM A QUEUE

BACKGROUND OF THE INVENTION

1. Technical Field

The present invention relates in general to a system and method for flushing instructions in the execution unit of a processor. More particularly, the present invention relates to a system and method for assigning a counter to each instruction in the execution unit in order to determine which instructions in the execution unit should be flushed in the event of an exception condition on the processor.

2. Description of the Related Art

Pipeline processing is a technique that provides simultaneous, or parallel, processing within a computer. It refers to overlapping operations by moving data or instructions into a conceptual pipe with all stages of the pipe executing simultaneously. For example, while one instruction is being executed, the computer may be decoding the next instruction. In vector processors, several steps in a floating point operation may be processed simultaneously.

The pipeline is divided into segments and each segment can execute its operation concurrently with the other segments. When a segment completes an operation, it passes the result to the next segment in the pipeline and fetches the next operation from the preceding segment. The final results of each instruction emerge at the end of the pipeline in rapid succession.

Out-of-order execution is a technique used to gain an edge in speed and performance. However, occasionally out of order execution may create a hazard. A hazard may cause the microprocessor to flush the fetched but incomplete instructions from the pipeline stages and to subsequently refill the pipe. However, as the number of pipeline stages in a processor increases, the overhead of flushing and refilling the pipe also increases leading to reduced performance.

Determining the retirement, or flush point, of a given instruction is a critical function in microprocessor design. For out-of-order designs, various approaches have been proposed. In an in-order design, an issue queue may allow certain instructions, for example from a floating point pipeline, to issue and execute in parallel with other instructions, such as fixed point instructions from a different pipeline. While using a plurality of pipelines allows greater throughput of instructions through the multiple pipelines, it also creates certain challenges when instruction flushes occur.

One challenge of using multiple pipelines in an in-order processor is that a mechanism is needed to keep track of the order that instructions were issued to the execution units that are running in parallel and may run independently of each other (such as the pipeline for floating point instructions and the pipeline for fixed point instructions). In other words, a mechanism is needed to allow the issue queue and pipeline of one execution unit to be decoupled from the various issue queues and pipelines of other execution units so that greater efficiency and throughput can be achieved while still maintaining a sense of order regarding an exception (flush) point in an in-order processor. A further challenge is that the mechanism used to keep track of the issue queues and execution pipelines with respect to each other, needs to be fast and efficient so that it does not degrade the overall speed and efficiency of the processor.

What is needed, therefore, is a system and method that tracks the order of instructions in one execution unit with respect to instructions in another execution unit without adding undue complexity that hampers system performance. One execution unit will become the reference point for other execution units that operate independently and may have issue queues that prevent simple synchronization between pipelines. Furthermore, what is needed is a system and method that allows for more complex flush operations, such as the ability to flush all instructions that are at least one instruction away from the exception point.

SUMMARY

It has been discovered that the aforementioned challenges are resolved using a system and method that tracks the order of instructions in an execution unit using a counter to correlate execution of instructions in a different execution unit. In one embodiment, a saturating, decrementing counter is used. When an instruction is sent to a "parallel" execution unit, a counter corresponding to the instruction is initialized to a value that corresponds to the length of a pipeline of one of the execution units (such as the load/store unit, the fixed-point execution unit, etc.) that becomes the "reference" execution unit pipeline.

As the instruction progresses through the parallel pipeline, its counter is decremented until it reaches zero. Once the counter reaches zero it will be completed by the execution unit. If a flush condition occurs, instructions with counters equal to zero are maintained (i.e., not flushed or invalidated), while other instructions in the pipeline are invalidated. Some common examples of flush conditions are cache misses, branch mis-predictions, data-alignment errors, and invalid instruction forms.

In one embodiment, different types of flushes are available. Different flush types are useful to allow the processor more flexibility in handling exception conditions. When a "flush all" condition occurs, all instructions with counter values greater than zero are flushed (i.e., invalidated), and instructions with counter values of zero are maintained in the pipeline. When a "flush N+1" condition occurs, all instructions with counter values greater than zero are flushed, however the "oldest" instruction with a counter value of one is also maintained and is not invalidated or flushed. To determine which instruction is the "oldest," one or more "age bits" are assigned to each instruction to indicate the order in which the instructions entered the issue logic. In one embodiment using dual-issue logic where two instructions can be issued during the same instruction cycle, the first instruction in the instruction stream is assigned an age bit attribute of "0" (older) and the second instruction is assigned an age bit attribute of "1" (younger). Finally, when a "flush N+2" condition occurs, all instructions with counter values greater than one are flushed, and instructions with counter values of zero or one are maintained and not flushed.

In this manner, the issue queue is essentially decoupled from other queues in the system. For example, a second queue, apart from the issue queue, can be used to issue instructions to one or more execution units. In this example, the first "issue" queue issues instructions to multiple execution units with one or more of the execution units sharing a second issue queue. Other execution units may not use a second issue queue, whereupon the first issue queue logic issues sends commands directly to an execution pipeline. While instructions in the second issue queue may stall before being issued to one of the execution units tied to the second issue queue, the counter values assigned to the instructions continue to decrement upon each instruction cycle. In this manner, the second issue queue can be decoupled from the execution units without a second issue queue while still maintaining a sense of order regarding an exception (flush) point. In this manner, instructions issued before a flush point can complete, while those instructions issued after a flush point are effectively and efficiently flushed from the respective execution unit pipelines. In addition, providing various types of flush conditions provides additional granularity so that a more exact flush point location can be efficiently identified without having to re-issue instructions that could properly be completed.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
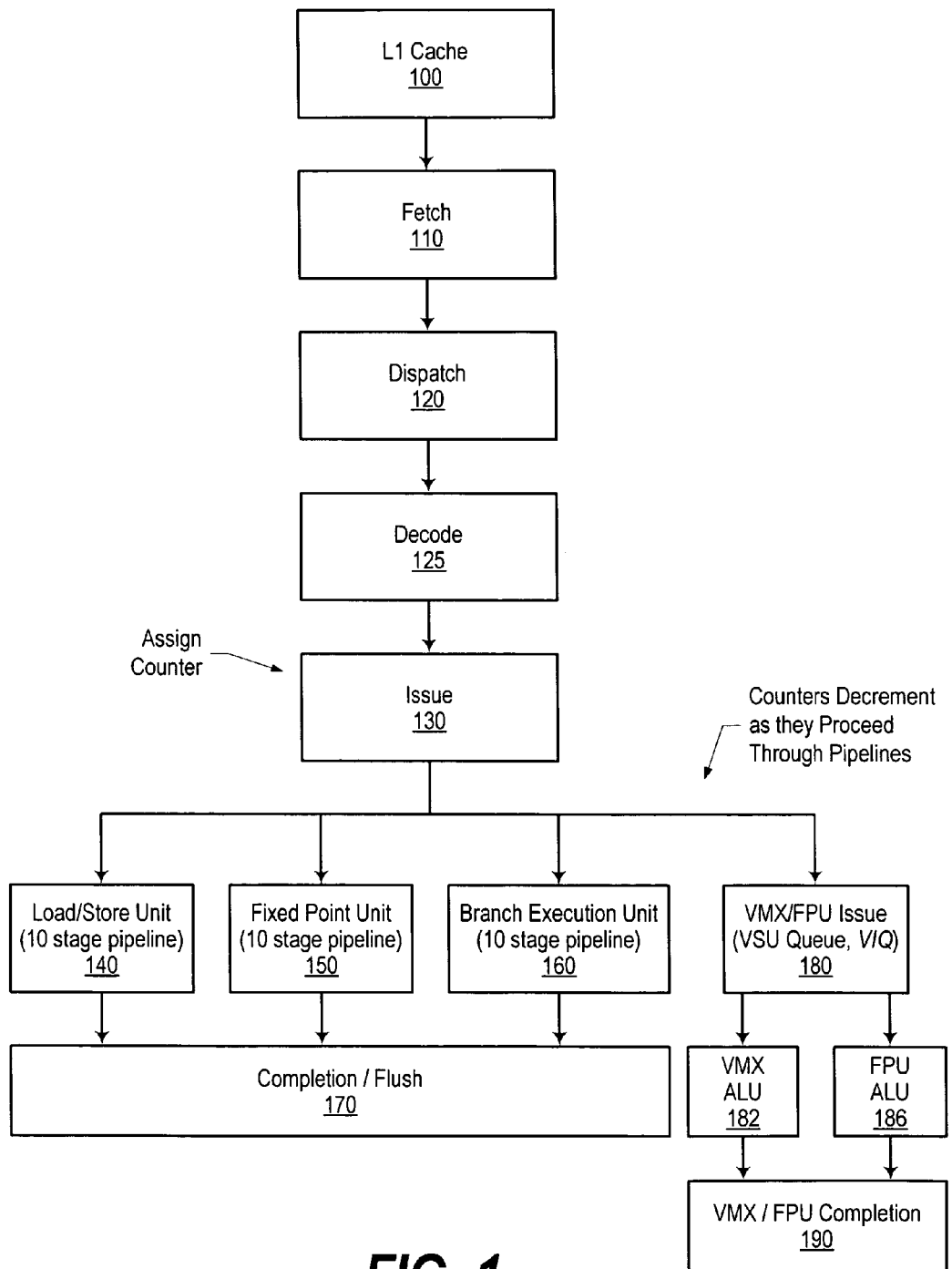
FIG. 1 is a high level diagram showing various processor components that handle instruction flushes from a queue using a counter.

FIG. 1 is a high level diagram showing various processor components that handle instruction flushes from a queue using a counter. Level One (L1) cache 100 is memory that is very high speed but small in size. The processor tries to read instructions from level one cache 100 first. If the required instruction is not present in the L1 cache, the L2 cache (now shown) is tried next. L2 cache is a larger size but slower speed than the L1 cache. If the required instruction is not present in the L2 cache, the system memory (DRAM) or L3 cache if there is one, is tried next. The slower the cache, the longer the wait for the needed instruction.

Fetch circuitry 110 is used to fetch needed instructions from L1 cache 100 or other memory areas, such as the L2 cache. In addition, Fetch circuitry 110 retrieves predicted instruction information from branch scanning. In one embodiment, there are two instruction buffer stages for two threads. In one embodiment, the instruction buffer is a FIFO queue which is used to buffer up to four instructions fetched from the L1 ICache for each thread when there is a downstream stall condition. An Instruction buffer stage is used to load the instruction buffers, one set of instruction buffers for each thread. Another instruction buffer stage is used to unload the instruction buffer and multiplex (mux) down to two instructions (Dispatch 120). In one embodiment, each thread is given equal priority in dispatch, toggling every other cycle. Dispatch also controls the flow of instructions to and from microcode, which is used to break an instruction that is difficult to execute into multiple "micro-ops". The results from dispatch 120 and the microcode are multiplexed together to provide an instruction to decode logic 125.

Decode circuitry 125 is used to assemble the instruction internal opcodes and register source/target fields. In addition, dependency checking starts in one stage of the decoder and checks for data hazards (read-after-write, write-after-write). Issue logic 130 continues in various pipeline stages to create a single stall point which is propagated up the pipeline to the instruction buffers, stalling both threads. The stall point is driven by data-hazard detection, in addition to resource-conflict detections, among other conditions. Issue logic 130 determines the appropriate routing of the instructions, upon which they are issued to the execution units. In one embodiment, each instruction can be routed to five different issue slots: the fixed-point unit 150, load-store unit 140, branch unit 160, and two to the VSU issue queue 180, also known as the VMX/FPU Issue Queue as this queue handles VMX and floating-point instructions.

The VSU issue queue is a second queue, in addition to issue queue 130, that is used to issue instructions to either floating point execution unit 186 or VMX execution unit 182. Both the floating point unit and the VMX unit include pipelines. Issue logic 130 issues instructions to VSU issue queue 180 without checking for dependencies. VSU issue logic has separate dependency-checking mechanisms for handling dependencies of VSU instructions. While instructions are in VSU issue queue 180 they may stall while dependencies are being resolved. However, counters assigned to the instructions issued to VSU issue queue 180 continue to decrement while they are waiting in the queue.

In one embodiment, issue logic 130 assigns a counter to one or more of the instructions issued to the various instruction unit pipelines. In this manner, when a flush condition occurs, the counters are evaluated and instructions that were newly added to the pipeline are flushed (invalidated), while those that were added to the pipeline before the flush point are kept in the pipeline (not invalidated). In one embodiment, a saturating-decrementing counter is used to initialize each counter to a value corresponding to the length of a reference pipeline that determines the point at which instruction can no longer flush and must complete (termed the "commit point"). For example, in a system with a 10 cycle commit point, the counter would be initialized to 10. During each instruction cycle that the instruction is waiting to be executed by an instruction unit, whether in VSU issue queue 180 or in the execution pipeline, the counter is decremented. In this embodiment, when the instruction reaches zero, it is maintained at zero (i.e., it does not become a negative value, which is referred to as "saturation"). When a flush condition occurs, those instructions with a counter value of zero are maintained in the pipeline and will complete (e.g., at completion 170 in the case of load/store instructions, fixed-point instructions, and branches, and at completion 190 in the case of VMX instructions and floating-point instructions).

Different types of flushes can occur in order to precisely determine the point at which instructions should complete or flush. A "flush all" type of flush causes all instructions with a counter greater than zero to be flushed. In a "flush n+1" type of flush, instructions with a counter greater than zero are flushed, except the oldest instruction with a counter value of one (1) is retained in the pipeline. To determine which instruction is the "oldest," one or more "age bits" are assigned as attributes to each instruction to indicate the order in which the instructions entered the issue logic. In one embodiment that uses dual-issue logic where two instructions can be issued during the same instruction cycle, the first instruction in the instruction stream is assigned an age bit attribute of "0" (older) and the second instruction is assigned an age bit attribute of "1" (younger). In a "flush n+2" type of flush, instructions with a counter greater than one are flushed while instructions with counter values of zero or one are maintained in the pipeline.

Figure 2:
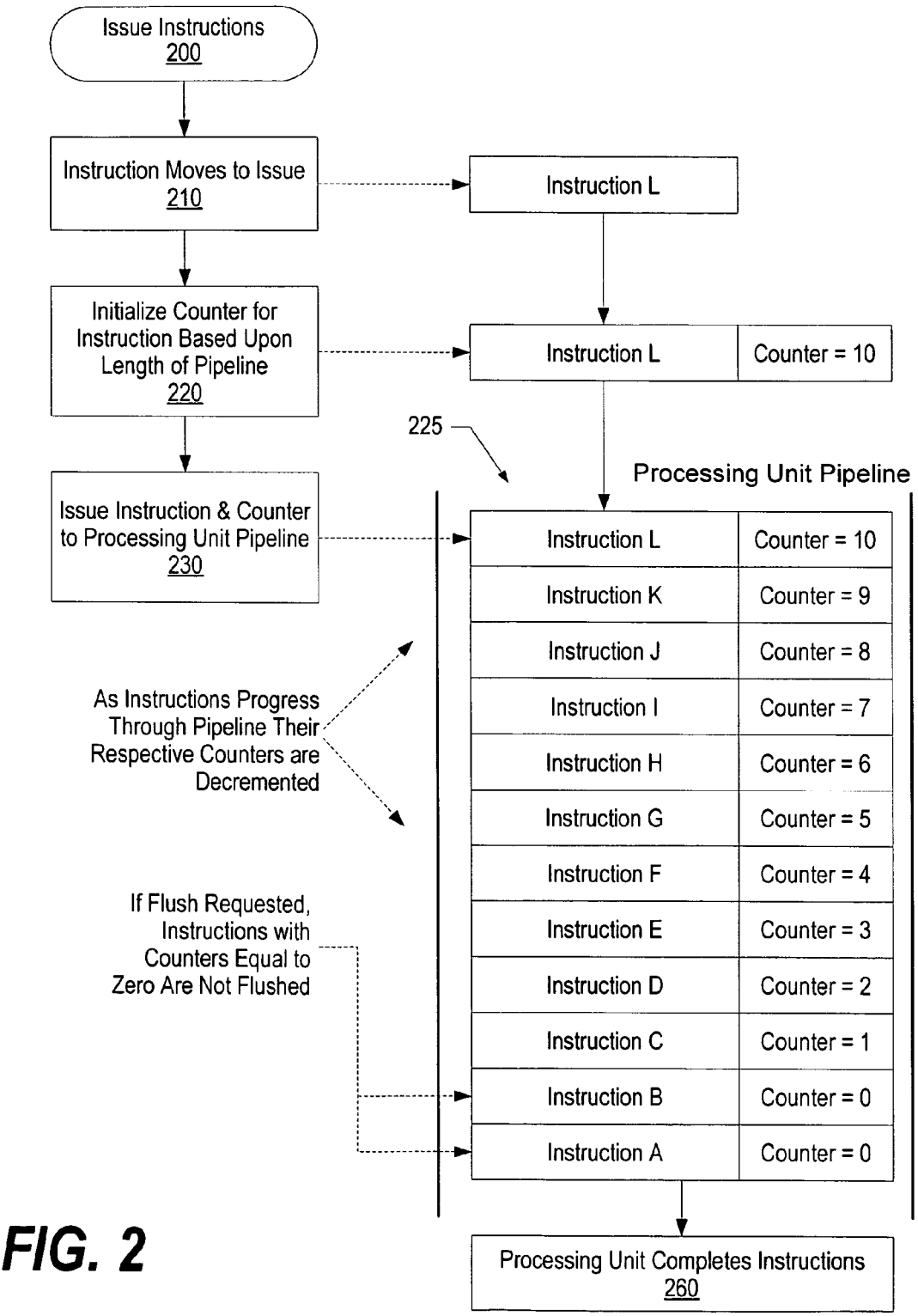
FIG. 2 is flowchart showing an instruction being issued with a counter that tracks the instruction's progression through an execution unit pipeline.

FIG. 2 is flowchart showing an instruction being issued with a counter that tracks the instruction's progression through an execution unit pipeline. Issue logic 200 commences when an instruction is moved to the issue logic circuitry (step 210). In the example shown, "Instruction L" is being moved to the issue logic. At step 220, a counter is initialized based on the length of the pipeline. In the example shown, Instruction L's counter is initialized to ten. At step 230, the issue logic issues the instruction to the appropriate execution unit pipeline (e.g., the load/store unit, the fixed point unit, the branch unit, etc.).

In the example shown, Instruction L joins several other instructions that have already been issued to execution unit pipeline 225. Instructions A through K are shown in the pipeline, each with a counter value that decrements as the instruction progresses through the pipeline. The saturation, decrementing counter decrements the counter until it reaches zero and then fixes the counter at zero for the remaining stages that the instruction is in the pipeline. For example, Instructions A and B are both shown with a counter of zero. The instruction at the end of the pipeline (e.g., Instruction A) is next to be processed by the completion unit at step 260.

If a "flush" condition is encountered, instructions with counters of zero are maintained in the pipeline and will be completed by the execution unit, while those instructions with counters greater than zero will be flushed (invalidated). In one embodiment, additional flush types are provided (e.g., flush N+1 and flush N+2, described in FIG. 1), which may cause an instruction with a counter of one (e.g., Instruction C) to be maintained in the pipeline and not be invalidated.

Figure 3:
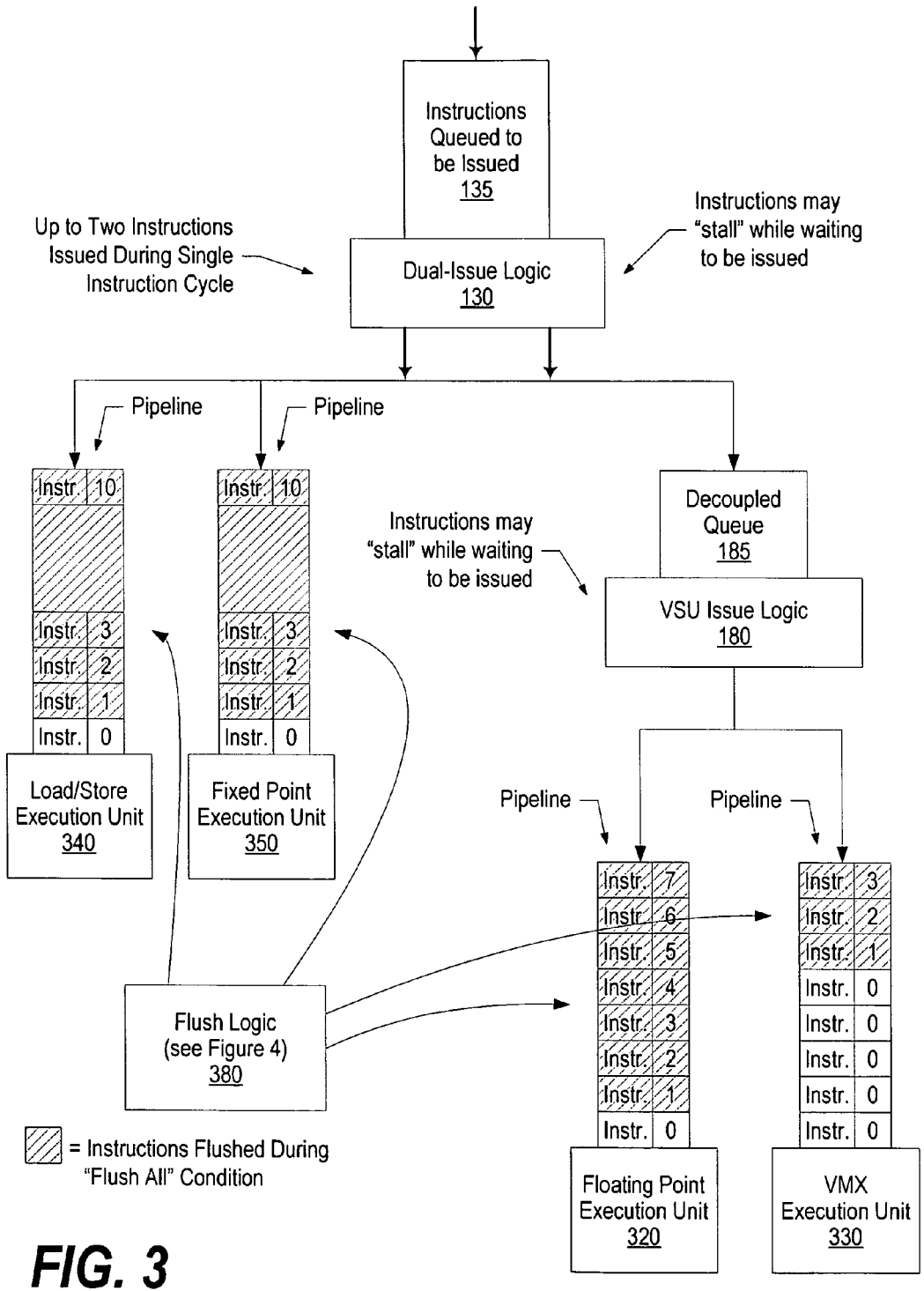
FIG. 3 is a diagram showing instructions being issued to a decoupled queue and multiple pipelines with counters used to track progression of instructions through pipelines with respect to the order in which the instructions were issued.

FIG. 3 is a diagram showing instructions being issued to a decoupled queue and multiple pipelines with counters used to track progression of instructions through pipelines with respect to the order in which the instructions were issued. Issue queue 135 stores instructions waiting to be issued. Dual-issue logic 130 issues up to two instructions during each instruction cycle. In the embodiment shown, dual-issue logic resolves any dependencies for load/store and fixed point instructions before issuing the instructions to load/store execution unit 340 and fixed point execution unit 350. For floating point and VMX instructions, however, dual-issue logic 130 issues the instruction directly to decoupled queue 185 which is managed by VSU issue logic 180. VSU issue logic resolves any dependencies of floating point or VMX execution units before issuing the instructions to either floating point execution unit 320 or VMX execution unit 330.

In the example shown there are four pipelines, however the dual-issue logic only issues up to two instructions per cycle. Therefore, some of the "instructions" shown for a given cycle will be "no-op" instructions. In addition, the dual-issue logic sets an "age bit" attribute for each instruction indicating which instruction appeared first in queue 135. In one embodiment, when two instruction issue during the same instruction cycle, the instruction that appeared first in queue 135 has its age bit set at zero ("0", older) and the other instruction has its age bit set to one ("1", younger). Keeping track of the order in which the instructions appeared in issue queue 135 is helpful when deciding which instructions to flush, especially in a "flush n+1" situation (described in further detail in FIG. 5).

Before instructions are issued from dual-issue logic 130 they are initialized with a decrementing saturation counter. Each instruction is initialized with a counter corresponding to the "commit-point" of the processor. For example, if it takes ten instruction cycles to resolve any unknowns regarding an instruction (e.g., a branch-mispredict, a cache miss, etc.), then the counter is initialized to ten. During every instruction cycle, each counter corresponding to each issued instruction is decremented by one. Decrementing takes place if the instruction is in a second queue (decoupled queue 185), waiting to be issued to an execution unit managed by secondary issue logic (VSU issue logic 180), or if the instruction has been issued from the second queue to execution unit pipeline.

Instructions waiting to issue from decoupled queue 185 can be stalled while waiting for dependencies to be resolved. While an instruction is waiting in decoupled queue 185, its counter continues to decrement. Therefore, when instructions are eventually issued to the execution units, the counter of the instruction issuing to the floating point execution unit might be different from the counter value of the instruction issuing to the VMX execution unit. However, once a counter reaches zero ("0"), it stays at zero and is not further decremented. In the example shown, five of the instructions in the VMX execution unit have counters that have reached zero, while only one instruction in the floating point execution unit has reached zero.

When a flush is triggered, flush logic 380 uses the counters to determine which instructions in decoupled pipelines (320 and 330) are flushed (invalidated) and which instructions remain in the pipeline for execution by their respective execution units. Non-decoupled pipelines (340 and 350) are referred to as "reference pipelines." While a counter can be assigned to instructions in the reference pipelines similar to the decouple pipelines, in one embodiment the instruction in reference pipelines can simply be flushed based upon their position in the pipeline because there is no intervening secondary queue that can affect the order of instructions in these pipelines.

Figure 4:
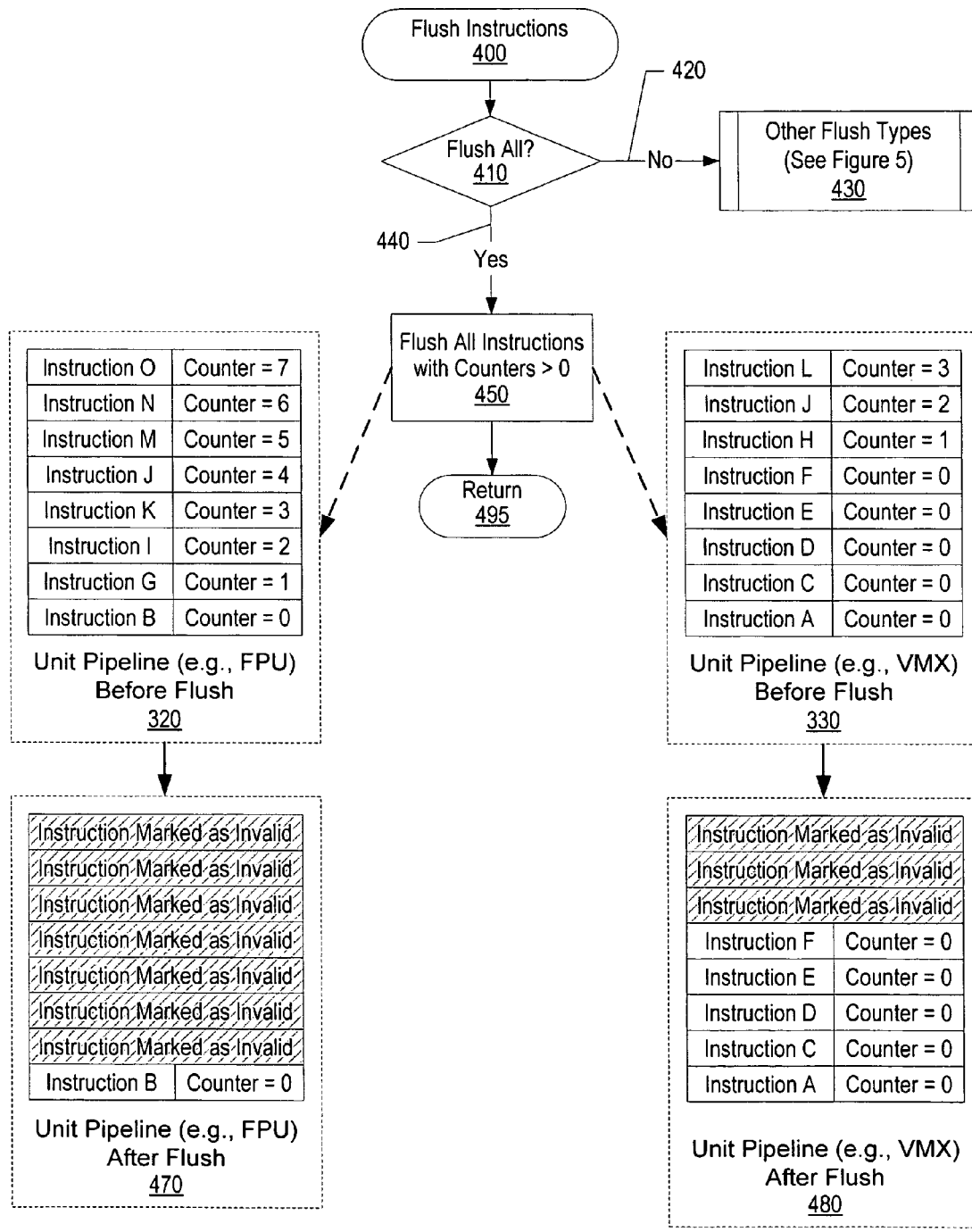
FIG. 4 is a flowchart showing processing of a "flush all" exception.

FIG. 4 is a flowchart showing processing of a "flush all" exception. Flush instruction processing commences at 400 whereupon a determination is made as to whether the type of flush exception is a "flush all" exception (decision 410). If the type of flush exception is not a "flush all" exception, then decision 410 branches to "no" branch 420 whereupon other flush exceptions are processed (predefined process 430, see FIG. 5 and corresponding text for processing details).

On the other hand, if the type of flush being performed is a "flush all" type, then decision 410 branches to "yes" branch 440 whereupon, at step 450, all instructions with counters greater than zero are flushed (invalidated) before processing returns at 495. Using the instructions from the example issued in FIG. 3, the pipelines are depicted before and after the "flush all" is processed. Unit pipeline 320 is shown with eight instructions in its various stages, and the same unit's pipeline is shown with all instructions except for Instruction B being invalidated after the flush has been processed. Likewise, unit pipeline 330 before the flush includes eight instructions, but after the flush, five instructions with a counter of zero (Instructions A, C, D, E, and F) remain in the pipeline with the rest of the instructions being flushed (invalidated). The reason that fewer instructions in pipeline 330 were flushed (i.e., more of these instructions had a counter of zero), is because the secondary issue logic (VSU issue logic 180 shown in FIG. 3) stalled one or more instructions before issuing them. Each cycle that the instructions waited in decoupled queue 185, their respective counters were decremented by one. Therefore, when the instructions are finally issued from the secondary issue logic (VSU issue logic 180), their counters are not necessarily the same because of the cycles needed to resolve dependencies regarding some of the instructions.

Figure 5:
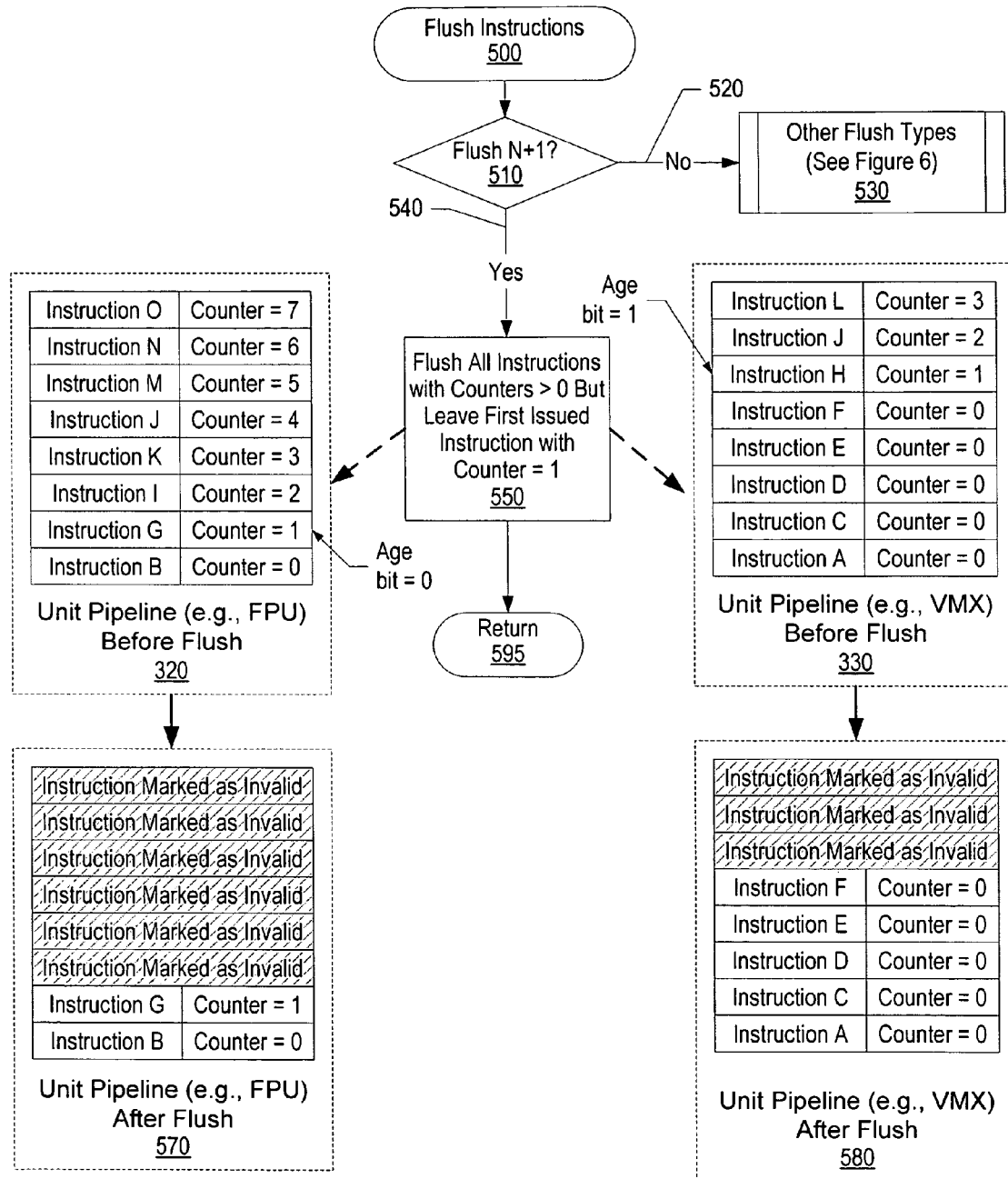
FIG. 5 is a flowchart showing processing of a "flush N+1" exception.

FIG. 5 is a flowchart showing processing of a "flush N+1" exception. Processing commences at 500 and is quite similar to that shown in FIG. 4. However in FIG. 5, a "flush N+1" exception is processed. A determination is made as to whether the exception is a "flush N+1" exception (decision 510). If the exception is not a "flush N+1" exception, decision 510 branches to "no" branch 520 whereupon other types of flushes are processed (predefined process 530, see FIG. 6 and corresponding text for processing details). On the other hand, if the flush type is a "flush N+1" type of exception, decision 510 branches to "yes" branch 540 whereupon, at step 550, all instructions with counters greater than zero are flushed (invalidated) but the oldest instruction with a counter value of one (1) is left in the pipeline (not invalidated), after which processing returns at 595. In one embodiment, the issue logic keeps track of the order in which instructions were issued in order to determine which instruction is the oldest instruction with a counter value of one. One way that this is accomplished is by assigning an "age bit" to instructions issued during the same instruction cycle. The instruction that appeared in the primary issue queue 135 first are assigned an age bit attribute of zero ("0") and the other instruction is assigned an age bit attribute of one ("1").

Similar to FIG. 4, a depiction of the pipelines before the flush (pipelines 320 and 330) and after the flush (pipelines 570 and 580) is shown. An additional instruction (Instruction G), which is the oldest instruction with a counter value of one, remains in the pipeline, along with Instructions A, B, C, D, E, and F which all have counter values of zero. The remaining instructions have all been invalidated.

Figure 6:
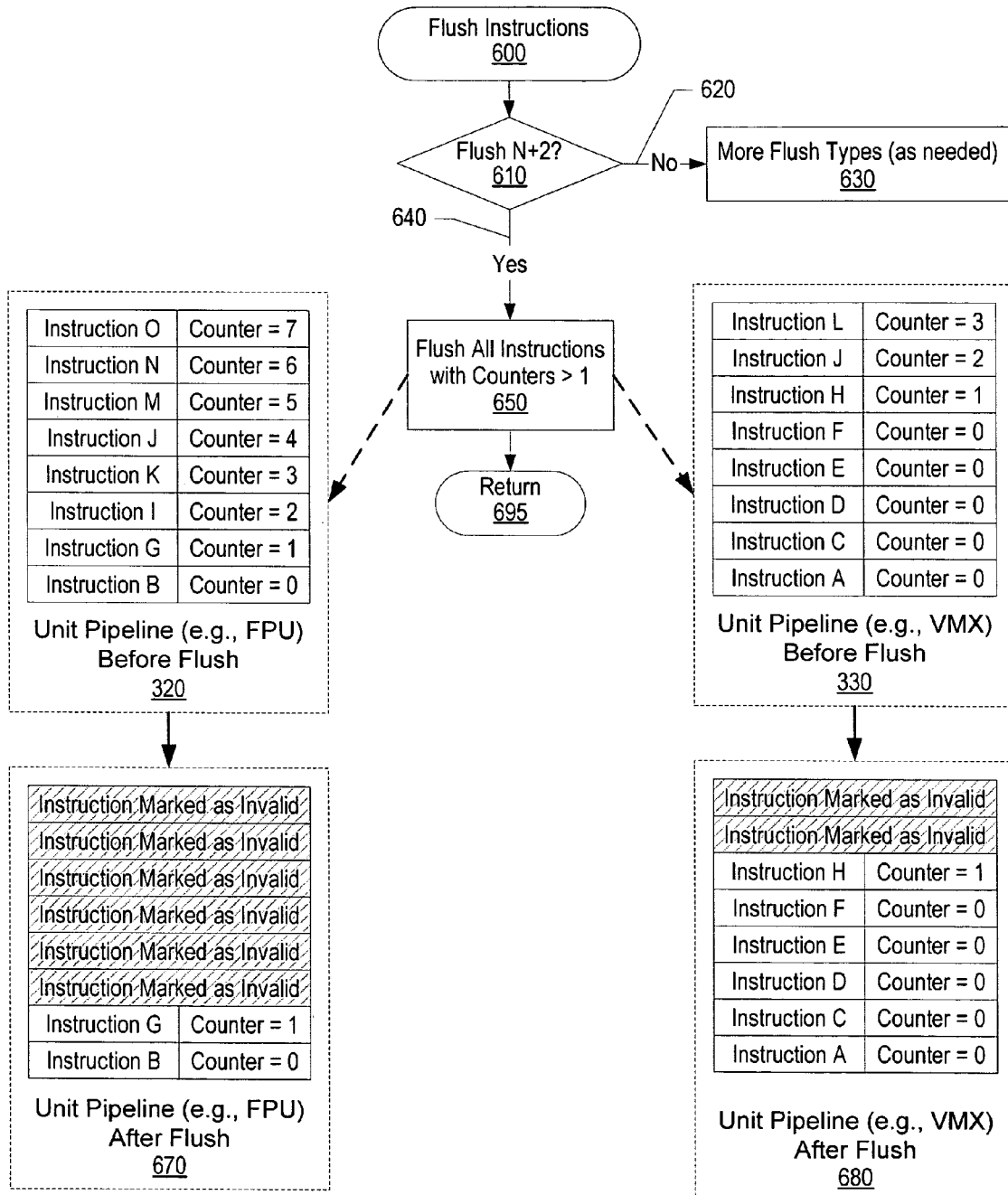
FIG. 6 is a flowchart showing processing of a "flush N+2" exception.

FIG. 6 is a flowchart showing processing of a "flush N+2" exception. Processing commences at 600 and is quite similar to that shown in FIGS. 4 and 5. However in FIG. 6, a "flush N+2" exception is processed. A determination is made as to whether the exception is a "flush N+2" exception (decision 610). If the exception is not a "flush N+2" exception, decision 610 branches to "no" branch 620 whereupon, at step 630, other types of flushes are processed (e.g., other flushes, such as "flush N+3," etc. can be implemented depending upon the amount of control needed for flushing commands from a pipeline). On the other hand, if the flush type is a "flush N+2" type of exception, decision 610 branches to "yes" branch 640 whereupon, at step 650, all instructions with counters greater than one are flushed (invalidated), after which processing returns at 695. Similar to FIGS. 4 and 5, a depiction of the pipelines before the flush (pipelines 320 and 330) and after the flush (pipelines 670 and 680) is shown. Each instruction with a counter of zero or one (Instructions A through H) remain in the pipelines, and the remaining instructions have all been invalidated.

Figure 7:
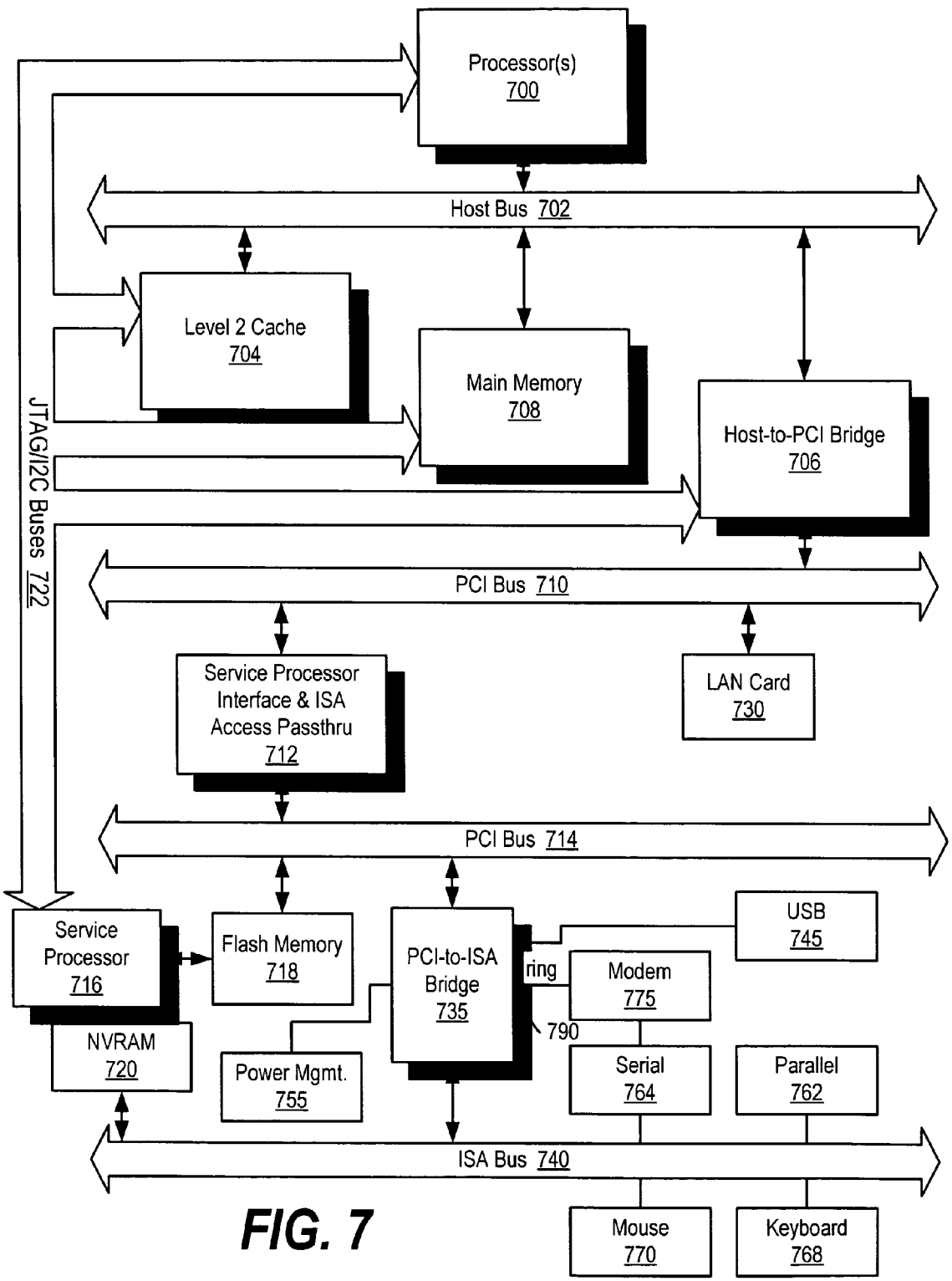
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

Figure 8:
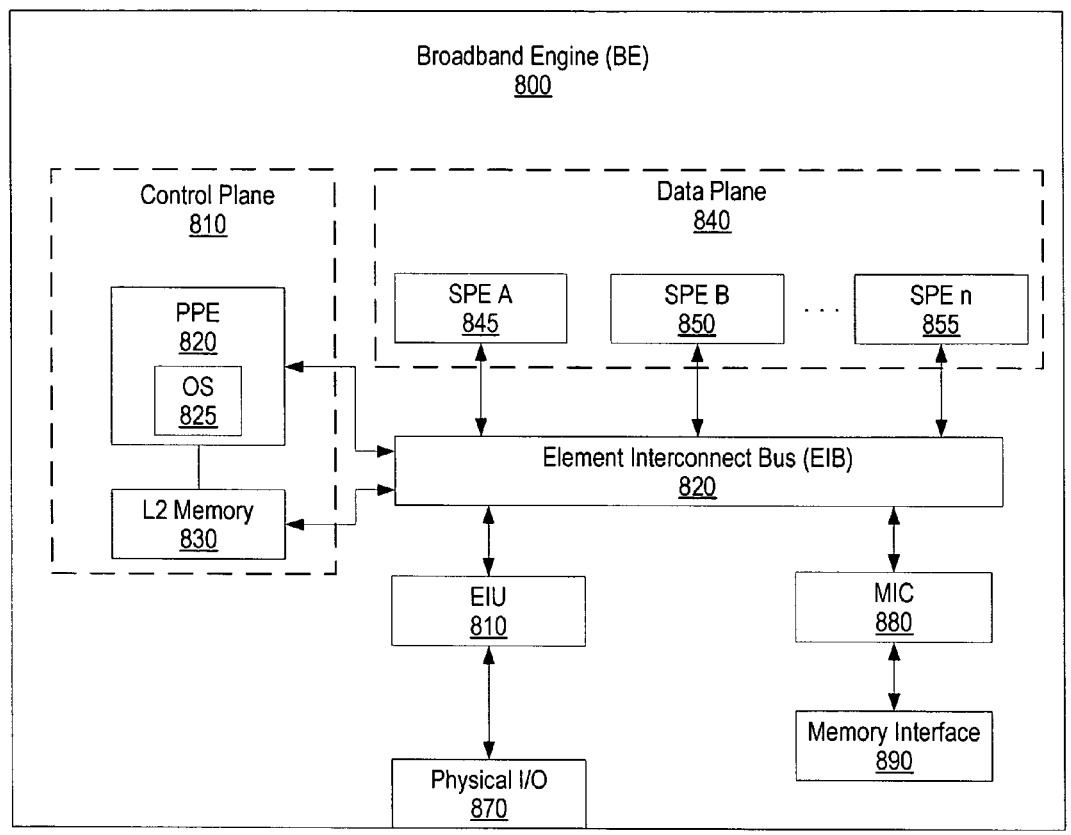
FIG. 8 is a block diagram of a broadband engine that includes a plurality of heterogeneous processors in which the present invention can be implemented.

FIG. 8 is a block diagram of a computing device capable of implementing the present invention. The architecture shown in FIG. 8 includes heterogeneous processors that share a common memory and a common bus. Broadband Engine (BE) 800 sends and receives information to/from external devices through element interconnect unit (EIU) 810, and distributes the information to control plane 810 and data plane 840 using element interconnect bus 820. Control plane 810 manages BE 800 and distributes work to data plane 840.

In addition, element interconnect bus (EIU) 860 provides read and write requests to memory interface controller (MIC)

880. Memory interface controller 880 communicates the requests to memory interface 890 that, in turn, communicates with external memory.

Control plane 810 includes power processing element (PPE) 820, which runs operating system (OS) 825. For example, PPE 820 may be a Power PC core that is embedded in BE 800 and OS 825 may be a Linux operating system. PPE 820 manages a common memory map table for BE 800. The memory map table corresponds to memory locations included in BE 800, such as L2 memory 830 as well as non-private memory included in data plane 840.

Data plane 840 includes Synergistic Processing Elements (SPE's) 845, 850, and 855. Each SPE is used to process data information and each SPE may have different instruction sets. For example, BE 800 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic execution unit (SPU), which is a processing core, such as a digital signal processor, a microcontroller, a microprocessor, or a combination of these cores.

SPE 845, 850, and 855 are connected to element interconnect bus (EIB) 820, which passes information between control plane 810, data plane 840, EIU 110, and MIC 880. EIB 820 is an on-chip coherent multi-processor bus. EIU 870 includes flexible input-output logic, which dynamically assigns interface pins to input-output controllers based upon peripheral devices that are connected to BE 800.

While the broadband engine described in FIG. 8 is capable of executing the processes described herein, this design is simply one example of a computer system design. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    initializing each of a plurality of counters, each counter corresponding to one of a plurality of instructions, to an initialization value when the instructions are issued from a first issue queue to a plurality of units, wherein one of the units is a second issue queue, and wherein the initialization value for each counter is set to a commit point for its corresponding instruction, wherein the commit point for each instruction is a number of instruction cycles after which the instruction can not be flushed;
    issuing the plurality of instructions issued to the second issue queue to a plurality of execution unit pipelines, each of the execution unit pipelines being connected to an execution unit;
    after the initializing, decrementing the counters corresponding to the instructions during each of a plurality of instruction cycles until the instructions are executed by one of the execution units;
    identifying an "n+1" exception corresponding to one of the instructions that has been issued to one of the plurality of units;
    in response to identifying the "n+1" exception, performing the following:
        flushing instructions from the execution unit pipelines with counters greater than one, wherein instructions from the execution unit pipelines with counters equal to zero are not flushed;
        reading an age attribute associated with instructions with counters equal to one, wherein each instruction with a counter equal to one has an associated age attribute; and
        in response to reading the age attributes, flushing one or more instructions with counters equal to one from the execution unit pipelines based upon the instructions' age attributes.

2. The method of claim 1 wherein the execution unit is selected from the group consisting of a load/store unit, a fixed point unit, a branch exception unit, a VMX load/store unit, a VMX ALU, a floating point ALU, and a floating point load/store unit.

3. The method of claim 1 further comprising:
    issuing up to two instructions from the first issue queue during each instruction cycle, wherein the initialization value is the same for each instruction issued from the first issue queue during a same instruction cycle; and
    setting an age attribute for each instruction issued from the first issue queue, wherein the age attribute indicates the instructions' relative position to one another in an instruction stream stored in the first issue queue.

* * * * *